United States Patent [19]

Blease

[11] Patent Number: 4,997,402
[45] Date of Patent: Mar. 5, 1991

[54] TELESCOPING HORN

[75] Inventor: Wilfred J. Blease, Merrimack, N.H.

[73] Assignee: Pioneer Plastics, Inc., Greenville, N.H.

[21] Appl. No.: 521,756

[22] Filed: May 10, 1990

[51] Int. Cl.$^5$ .............. G10D 7/10; A63H 33/40; B06B 3/00

[52] U.S. Cl. ................ 446/202; 116/137 R; 84/330

[58] Field of Search .............. 116/137 R, 139, 140; 446/209, 202, 203, 204, 205, 206; 84/330, 387; 181/178, 179, 187, 188, 189, 190; D10/116, 119, 120; D14/204, 208; D17/10, 99

[56] References Cited

U.S. PATENT DOCUMENTS

| | | | |
|---|---|---|---|
| 773,344 | 10/1904 | Sanderson | 181/178 |
| 1,541,122 | 6/1925 | Dodge et al. | 181/178 |
| 1,763,336 | 6/1930 | Wilder | 84/387 |
| 2,435,535 | 2/1948 | Eaves | 181/188 |
| 3,808,733 | 5/1974 | Pipa | 446/202 |

*Primary Examiner*—William A. Cuchlinski, Jr.
*Assistant Examiner*—John L. Beres
*Attorney, Agent, or Firm*—Hamilton, Brook, Smith & Reynolds

[57] ABSTRACT

A telescoping horn, comprising a flared bell portion and a mouthpiece portion. The mouthpiece portion is slideable into the bell portion from an extended position into a telescope position along a common axis. There are means on both portions for limiting the amount of telescoping movement, as well as for limiting the amount of extended motion so that the horn portions remain in engagement with each other in both positions.

9 Claims, 2 Drawing Sheets

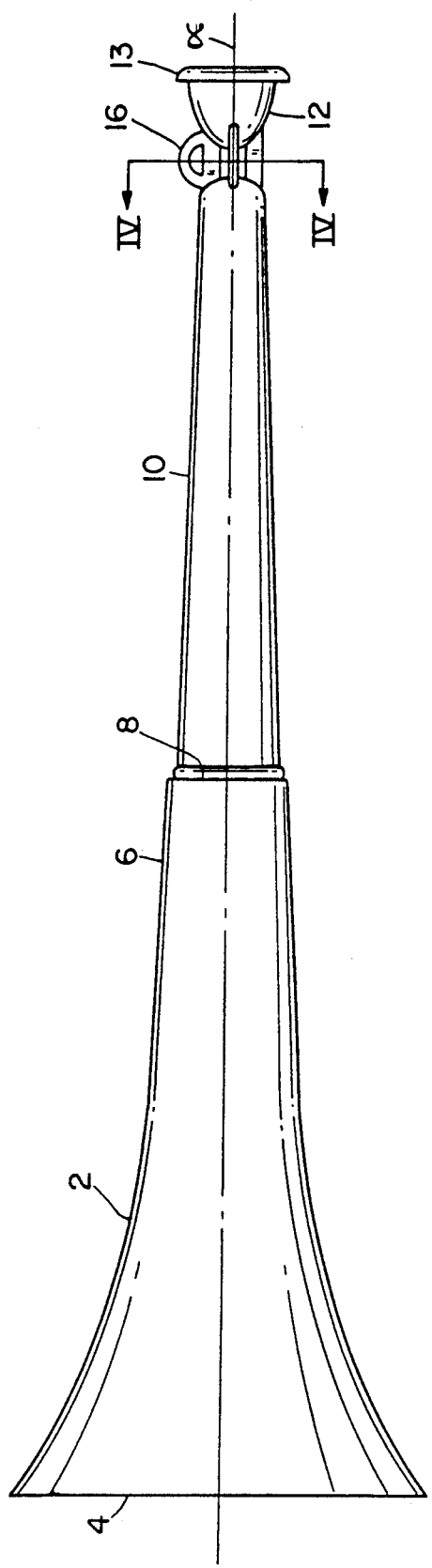
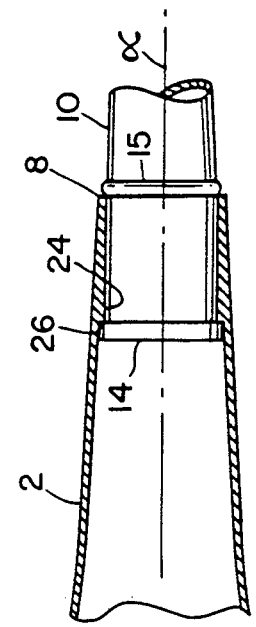
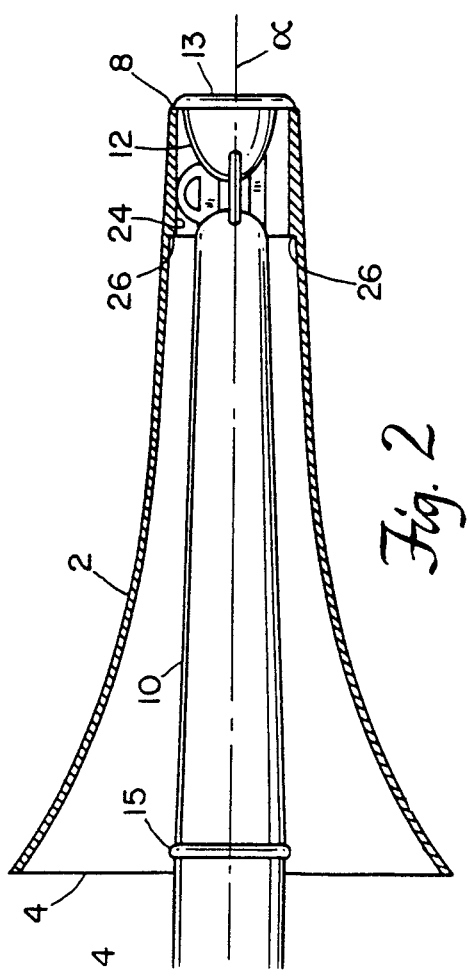
Fig. 2
Fig. 3

4,997,402

TELESCOPING HORN

FIELD OF THE INVENTION

This invention relates to horns in general and more particularly to a telescoping horn which is collapsable from an extended or operating position to a telescoped position in which it is substantially only half as long as it is in the extended position.

BACKGROUND OF THE INVENTION

Horns are virtually as old as recorded time. Primative horns assumed many forms. Some of the earliest were merely hollow seashells in their natural state having an opening, through or across which, a person blew to make a sound. Others were actual animal horns hollowed out and through which a person also blew to communicate, to make pleasant sound, which with other instruments, produced early music, or to warn of an encroaching enemy, for example.

As time evolved, obviously horns became more complex and were made capable of producing sounds of varying tones. Today, there are scores of differing types and shapes of horns.

The present invention, however, is directed to a collapsable, telescoping horn. Many horns include a flared bell shaped portion and a mouthpiece portion connected by tubing, which may be both straight and curved, as for example in a trumpet, or with moveable portions, as in a trombone. Such horns come both with and without valves.

There is today a need for lightweight, inexpensive horns that take up little space but which may be assembled in a length sufficient to produce a loud, clear tone, as for example, in sports stadia.

There is also need for a lightweight, collapsable horn capable of producing a loud, low-pitch sound for use by boatsmen to warn other boats or to signal in an emergency. Today, such devices are powered by aerosols which are not only undesirable to the ecology but which need to be replaced periodically.

It is an object of this invention to produce a telescoping horn of relatively simple construction which is small, readily portable but which, when extended, is capable of producing a loud, far-carrying sound.

SUMMARY OF THE INVENTION

The invention resides in a telescoping horn which has a flared bell portion which terminates in a bell mouth at one end and a smaller opening at the other. There is a mouthpiece portion having a cupped mouthpiece at one end which is opposite the bell mouth when the two portions are assembled. The mouthpiece portion is slideable, along a common axis, into the bell portion from an extended position.

At least a part of the mouthpiece portion near the end which is remote from the cupped mouthpiece, has an outer diameter which is larger than the smallest interior diameter of the bell portion, such that when the two portions are in the extended position they are prevented from being further separated from each other.

There is an annular flange on the cupped mouthpiece. The inner diameter of the smaller open end of the bell portion is smaller than the outer diameter of the annular flange, such that when the horn is in telescoped position, the annular flange engages the smaller open end of the bell portion, preventing the portions from being further telescoped. Thus, the two horn portions remain in engagement with each other in both the extended and the telescoped positions.

In one embodiment, there is a sleeve on the interior surface of the bell portion near the small open end. This creates an interior annular stop. A collar on the exterior of the mouthpiece portion located at the end remote from the cupped mouthpiece creates a second annular stop. The inner diameter of the sleeve is less than the outer diameter of the collar, such that when the portions of the horn are in the extended position, the two annular stops are in engagement, which prevents the horn's portions from being separated from each other.

An annular bead may be located on the mouthpiece portion and spaced axially from the collar, a distance which is substantially equal to the axial length of the sleeve located in the bell portion, such that when the portions are in the extended position, the annular bead engages the smaller end of the bell portion, in effect, sealing it.

There are means, adjacent the cupped mouthpiece for attaching a lanyard.

The above and other features of the invention, including various novel details, of construction and combinations of parts, will now be more particularly described with reference to the accompanying drawings and pointed out in the claims. It will be understood that the particular telescoping horn embodying the invention is shown by way of illustration only and not as a limitation of the invention. The principals and features of this invention may be employed in varied and numerous embodiments without departing from the scope of the invention.

BRIEF DESCRIPTION OF THE DRAWINGS

FIG. 1 is a side view of one embodiment of a horn in extended position embodying the features of the present invention.

FIG. 2 is a side view, partly in section, of the horn of FIG. 1 in the telescoped position.

FIG. 3 is a detail view, partly in section, of the horn in extended position showing the juncture of the two parts.

FIG. 4 is a sectional view, on enlarged scale, taken on the line IV—IV of FIG. 1.

DETAILED DESCRIPTION OF THE INVENTION

Figure 5:
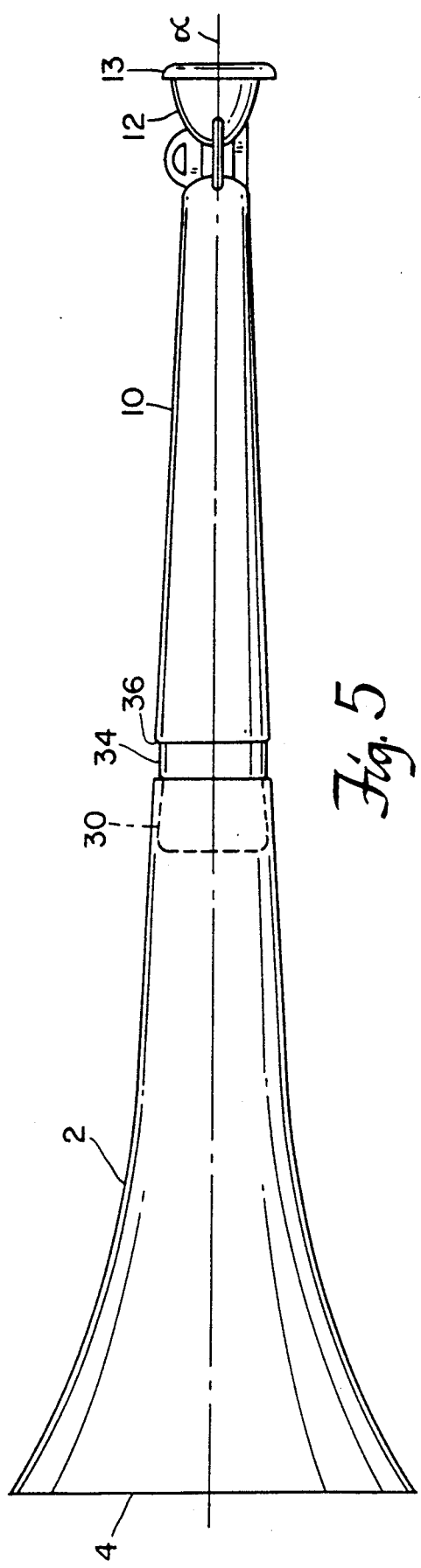
FIG. 5 is a side elevation of another embodiment of the horn in one extended position.

The invention is embodied in a two-part, telescoping horn, made preferably of flexible, lightweight plastic, but may be made of other equivalent materials. The horn includes a hollow, flared bell portion 2 terminating in a bell mouth 4 at one end. The telescoping bell portion curves gently from the bell mouth 4 to a tubular portion 6. The end of the horn opposite the flared bell portion has a flat, circular opening 8 smaller than the bell mouth. A second part of the horn comprises a hollow, gently tapered, conical mouthpiece portion 10 terminating in a cupped mouthpiece 12 having an annular flange 13. A circular collar 14 is located at the other end of the mouthpiece portion. Spaced inwardly from the collar 14 is an annular bead 15.

Adjacent the cupped mouthpiece 12 is a molded loop 16 for attaching a lanyard. The cupped mouthpiece is joined to the tapered mouthpiece portion 10 of the mouthpiece portion by a neck 18 which has four substantially flat reinforcing members 20 arranged in a cruciform configuration, as seen in FIG. 4.

FIG. 1 shows the mouthpiece portion 10 and the flared bell portion 2 in their operative position extending from each other along a common axis alpha. FIG. 2 illustrates the mouthpiece portion 10 telescoped into the flared bell portion along the axis.

An annular sleever 24 is formed on the inside of the flared bell portion 2 extending inwardly from the right-hand or smaller end, as viewed in the figures. The sleeve portion 24 creates an annular ridge or stop 26 on the interior of the flanged bell portion of the horn. In its extended or operating position as seen best in FIG. 3, the annular collar 14, or stop, on the end of the mouthpiece portion 10 engages the ridge 26, or stop, on the sleeve 24 and prevents the mouthpiece portion 10 from being pulled completely out of the bell portion 2 because the inner diameter of the sleeve 24 is less than the outer diameter of the annular collar 14.

The annular bead 15 is spaced from the collar 14 an amount equal to the axial length of the sleeve 24. In the extended position, the bead 15 abuts the flat, circular end 8 of the bell portion of the horn and acts as a seal. The diameter of the bead 15 is only slightly larger than the inner diameter of the sleeve 24 so that when it is desired to collapse or telescope the horn, the two parts are pushed together axially with the bead 15 expanding the sleeve slightly as it enters the interior of the bell portion 2.

Telescoping continues until the parts assume the FIG. 2 position whereupon the annular flange 13 on the cupped mouthpiece 12 abuts the flat, circular end 8 of the bell portion 2. This limits further movement and permits the horn to be carried with most of the mouthpiece portion telescoped axially inside the bell portion.

Thus, the parts always remain together whether they are in the FIG. 1, operative, or extended position or the FIG. 2, collapsed or telescoped position. It is obvious that the parts can be separated by forcably pulling them apart, but there is no reason to do this.

Figure 6:
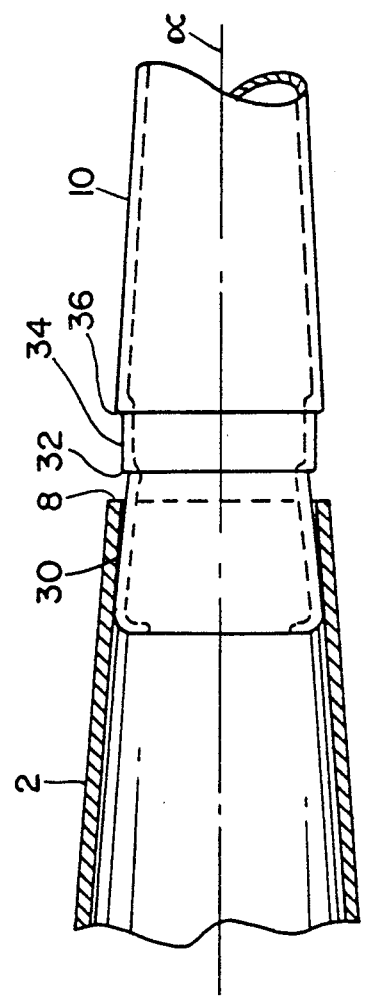
FIG. 6 is a detail view, partly in section, of the horn of FIG. 5 in another position of extension.

An alternative embodiment will be seen in FIGS. 5 and 6. In this embodiment, the flared bell portion 2 of the horn does not include an internal sleeve but has a smooth, tapering interior with the bell mouth 4 at one end and the flat, circular opening 8 at the other. In the collapsed or telescoped position, the flange 13 on the cupped mouthpiece 12 will touch the flat, circular small end 8 of the flared bell 12, as in the FIG. 1 embodiment.

As seen in FIG. 6, the mouthpiece portion 10 of the horn includes a first conical step 30 creating an annular ridge or stop 32 and a second conical step 34, creating a second annular ridge 36. The maximum diameter of the step 30 near the end opposite the cupped mouthpiece, is greater than the interior diameter of the small open end 8 of the bell portion 2. Thus, by force fit, the parts will stay together as shown in FIG. 6 in one extended position.

The mouthpiece portion 10 may be pushed into the bell portion 2 due to the flexibility of the plastic materials until the annular ridge or stop 32 abuts the circular end surface 8 of the bell portion 2, thus creating a second position of adjustment.

By forgoing the parts still farther together, the horn may be made slightly shorter in the axial direction, thereby increasing its pitch slightly. The annular stop or second ridge 36 then engages the flat, circular end 8 of the bell portion.

Still further telescoping the parts along the axis, they become fully telescoped. This occurs by forcing the stop 36 past the circular end surfaces 8 until the parts assume a position similar to that shown in FIG. 2, with the annular flange 13 abutting the circular end surface 8. The flexability of the plastic permits a larger diameter portion to momentarily expand a smaller diameter opening.

I claim:

1. A telescoping horn, comprising:
   (a) a flared bell portion having a bell mouth at one end;
   (b) a mouthpiece portion having a cupped mouthpiece at the opposite end when the two portions are assembled;
   (c) the mouthpiece portion being slidable into the bell portion from an extended position to a telescoped position along a common axis;
   (d) a sleeve on the interior of the bell portion located at the end remote from the bell mouth and creating an annular stop;
   (e) a collar on the exterior of the mouthpiece portion located at the end remote from the cupped mouthpiece and creating a second annular stop;
   (f) the inner diameter of the sleeve being less than the outer diameter of the collar, such that when the portions of the horn are in the extended position, the annular stop on the bell portion is in engagement with the annular stop on the mouthpiece portion, preventing the horn portions from being separated from each other; and
   (g) an annular bead located on the mouthpiece portion spaced axially from the collar a distance substantially equal to the axial length of the sleeve in the bell portion, such that when the portions are in the extended position, the annular bead engages the end of the bell portion which is remote from the bell mouth.

2. A telescoping horn, comprising:
   (a) a flared bell portion having a bell mouth at one end;
   (b) a mouthpiece portion having a cupped mouthpiece at the opposite end when the two portions are assembled;
   (c) the mouthpiece portion being slidable into the bell portion from an extended position to a telescoped position along a common axis;
   (d) a sleeve on the interior of the bell portion located at the end remote from the bell mouth and creating an annular stop;
   (e) a collar on the exterior of the mouthpiece portion located at the end remote from the cupped mouthpiece and creating a annular stop;
   (f) the inner diameter of the sleeve being less than the outer diameter of the collar, such that when the portions of the horn are in the extended position, the annular stop on the bell portion is in engagement with the annular stop on the mouthpiece portion, preventing the horn portions from being separated from each other;
   (g) an annular flange on the cupped mouthpiece; and
   (h) the inner diameter of the flared bell portion on the end remote from the bell mouth being smaller than the outer diameter of the annular flange, such that when the portions of the horn are in telescoped position, the annular flange engages the end of the flared bell portion remote from the bell mouth preventing the portions from being further telescoped.

3. A horn according to claim 2 wherein an annular bead is located on the mouthpiece portion and spaced axially from the collar a distance substantially equal to the axial length of the sleeve in the bell portion, such that when the portions are in the extended position, the annular bead engages the end of the bell portion which is remote from the bell mouth.

4. A horn according to claim 2 wherein there are means adjacent the cupped mouthpiece for attaching a lanyard.

5. A telescoping horn, comprising:
 (a) a flared bell portion having a bell mouth at one end;
 (b) a mouthpiece portion having a cupped mouthpiece at the other end when the two portions are assembled;
 (c) the mouthpiece portion being slidable into the bell portion from an extended position to a telescoped position along a common axis;
 (d) at least a part of the mouthpiece portion near the end remote from the cupped mouthpiece having an outer diameter larger than the smallest interior diameter of the flared bell portion near the end remote from the bell mouth, such that when the two portions are in the extended position, they are prevented from being separated from each other; and
 (e) an annular bead located on the mouthpiece portion spaced axially from the collar a distance substantially equal to the axial length of the sleeve in the bell portion, such that when the portions are in the extended position, the annular bead engages the end of the bell portion which is remote from the bell mouth.

6. A horn according to claim 5 wherein there are at least two annular stops on the mouthpiece portion on the end remote from the cupped mouthpiece having a diameter larger than the diameter of the end of the bell portion, such that the horn may set in at least two positions of adjustment.

7. A telescoping horn, comprising:
 (a) a flared bell portion having a bell mouth at one end;
 (b) a mouthpiece portion having a cupped mouthpiece at the other end when the two portions are assembled;
 (c) the mouthpiece portion being slidable into the bell portion from an extended position to a telescoped position along a common axis;
 (d) at least a part of the mouthpiece portion near the end remote from the cupped mouthpiece having an outer diameter larger than the smallest interior diameter of the flared bell portion near the end remote from the bell mouth, such that when the two portions are in extended positions, they are prevented from further telescoping;
 (e) annular flange on the cupped mouthpiece; and
 (f) the inner diameter of the flared bell portion on the end remote from the bell mouth being smaller than the outer diameter of the annular flange, such that when the portions of the horn are in telescoped position, the annular flange engages the end of the flared bell portion remote from the bell mouth preventing the portions from being further telescoped and the two horn portions remain in engagement with each other in both the extended and the telescoped positions.

8. A horn according to claim 7 wherein an annular bead is located on the mouthpiece portion and spaced axially from the collar a distance substantially equal to the axial length of the sleeve in the bell portion, such that when the portions are in the extended position, the annular bead engages the end of the bell portion which is remote from the bell mouth.

9. A horn according to claim 7 wherein there are means adjacent the cupped mouthpiece for attaching a lanyard.

* * * * *